J. P. McLEAN.

PISTON-PACKING.

No. 6,905. Reissued Feb. 8, 1876.

Witnesses:
Philip F. Larner
A. B. Cauldwell

Inventor:
James P. McLean,
By [illegible]
Attorney

UNITED STATES PATENT OFFICE.

JAMES P. McLEAN, OF NEW YORK, N. Y., ASSIGNOR TO AUGUSTUS O. BOURN, OF BRISTOL, RHODE ISLAND.

IMPROVEMENT IN PISTON-PACKINGS.

Specification forming part of Letters Patent No. 63,071, dated March 19, 1867; reissue No. 6,905, date February 8, 1876; application filed January 11, 1876.

*To all whom it may concern:*

Be it known that I, JAMES P. McLEAN, of the city of New York, in the county of New York and State of New York, have invented new and useful Improvements in Steam or other Packing for Piston-Rods, Cylinders, or Shafting; and I do hereby declare the following to be a full, clear, and exact description thereof, reference being had to the accompanying drawings, which are lettered to correspond with and form a part of this specification.

To enable those skilled in the manufacture and use of steam and other packing to construct and use packing embodying my improvements, I will refer to the drawings, in which—

Figure 1:
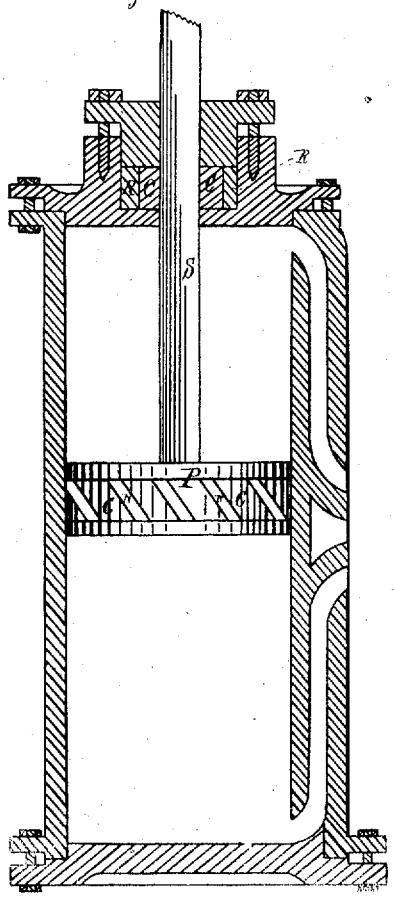
Figure 2:
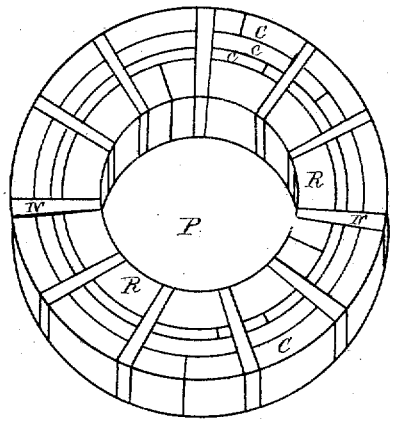
Figure 3:
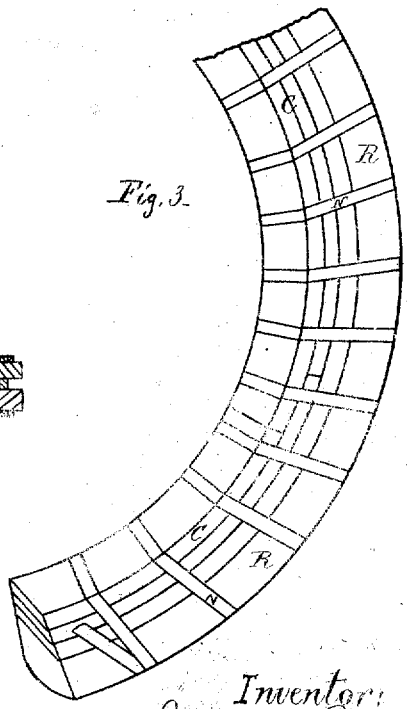

Figure 1 illustrates in section a steam-engine cylinder containing a piston and rod provided with my improved packing. Fig. 2 represents in perspective a piston-packing embodying my improvement detached from the piston. Fig. 3 represents in perspective, on an enlarged scale, a piece of my improved packing, adapted for use in a gland with a piston-rod.

In each of these figures the packing is shown to be composed of cork and of rubber, so arranged with relation to each other and to the surfaces with which the packing is to engage, that the rubber will operate as a follower and force the cork, charged with lubricating matter by absorption, against said surfaces. In each instance the cork serves as a compressible absorbent for the lubricating matter, and it is arranged in a series of concentric layers, each layer being parallel with the longitudinal surface against which the packing engages, and also concentric with said surfaces.

I am aware that cork and lead have heretofore been combined in packing, and that india-rubber has been heretofore combined with canvas and lead, and also that rubber has heretofore been used as a central core around which canvas, saturated in rubber, has been tightly wrapped; hence they are not claimed as my invention in this application when combined as above.

My invention consists in the combination of two elastic bodies or substances of different expansive and absorbent properties, so arranged that the absorbent body will be forced and held against the rod, shaft, or cylinder by the more expansive and more elastic substance—india-rubber. I find that steam causes a shrinkage of the absorbent packing, and hence it becomes necessary to either put in more packing or employ some other means to overcome said shrinkage and force the packing against the contact-surfaces; consequently I employ the india-rubber as a follower, which, being expansive and having a capacity for retaining its expansive powers, counteracts the aforesaid shrinkage and maintains a constant pressure of the absorbent packing against the surface with which it is to engage with packing-contact.

In the drawings, P denotes a piston, and S its rod. The piston-packing is shown combined with the piston in Fig. 1, and detached therefrom in perspective, on an enlarged scale, in Fig. 2. The gland or rod packing is shown in section in Fig. 1, and, on an enlarged scale, in perspective in Fig. 3. The absorbent material—cork—is shown at C, and in each instance it is arranged so as to be in contact with the surface of the rod or cylinder with which it packs, and this absorbent when in use is constantly forced toward and against said surfaces by the elastic body of rubber R. I secure the rubber and cork together by means of strips, (shown at N,) which are composed of lead or zinc, and are wound around the same, as shown in the drawings. When lead is used I would harden it a little by means of antimony, which composition may be rolled into sheets from which the strips may be cut. Zinc will be found to answer a good purpose in this connection, and will be sufficiently hard for ordinary packing uses, and, when forced against the surface with which the packing is to engage, the strips become embedded into the packing and hold it in shape without the requirement of canvas or other jackets. When in use the "quirks" or interstices of the absorbent become filled with the leaden or zinc particles and the lubricating-oil, thereby making the packing perfectly steam-tight. In my opinion, the cork, when filled, as stated, forms a lubricating packing equal to black lead, after shrinkage of the absorbent has been overcome by means of the elastic follower, as described. If necessary, I prepare the cork by coating it with a composition of black lead and pulverized soap-stone or talc, or these may be used separately for filling up the quirks or interstices of the cork, and protecting it from burning, as well as to add to its lubricating properties.

What I claim as new and useful, and desire to secure by these Letters Patent of the United States, is—

1. The combination, in a packing for pistons, rods, &c., of two elastic bodies or substances, one of which is an absorbent, and is arranged to engage in packing-contact with a cylinder or rod, and the other is arranged to operate as a follower for forcing the absorbent body against a cylinder or rod, substantially as described.

2. The combination, with two or more layers of a compressible and absorbent material, of an elastic rubber follower, substantially as described.

3. Packing composed of a body of cork for contact with a cylinder or rod, and of a body of rubber arranged to operate as an elastic follower for the cork, and of metallic strips for uniting the two bodies, substantially as described.

JAMES P. McLEAN.

Witnesses:
S. L. COLE,
JOHN AITKEN.